United States Patent [19] [11] 4,109,065
Will et al. [45] Aug. 22, 1978

[54] RECHARGEABLE AQUEOUS ZINC-HALOGEN CELL

[75] Inventors: Fritz G. Will, Scotia; Fay W. Secor, Schenectady, both of N.Y.

[73] Assignee: General Electric Company, Schenectady, N.Y.

[21] Appl. No.: 823,409

[22] Filed: Aug. 10, 1977

[51] Int. Cl.² ........................................ H01M 10/24
[52] U.S. Cl. ................................. 429/105; 429/199; 429/207
[58] Field of Search ............... 429/105, 101, 199, 206, 429/207, 29

[56] References Cited

U.S. PATENT DOCUMENTS 3,929,506  12/1975  Leddy et al. ........................ 429/199
4,049,886  9/1977  Will ...................................... 429/105

OTHER PUBLICATIONS

F. C. Cowlard et al., Vitreous Carbon–A New Form of Carbon, Journal of Materials Science 2, (1967) pp. 507–512.

Primary Examiner—Anthony Skapars
Attorney, Agent, or Firm—Paul R. Webb; Joseph T. Cohen; Leo I. MaLossi

[57] ABSTRACT

A rechargeable aqueous zinc-halogen cell is described which includes a casing, an ion exchange membrane in the casing defining a positive and a negative electrode compartment, an electrode substrate in each compartment, at least the electrode substrate in the positive compartment consisting of vitreous carbon, an aqueous electrolytic solution containing a zinc salt selected from the class consisting of zinc bromide, zinc iodide, and mixtures thereof in both compartments, and halogen in the positive compartment.

4 Claims, 1 Drawing Figure

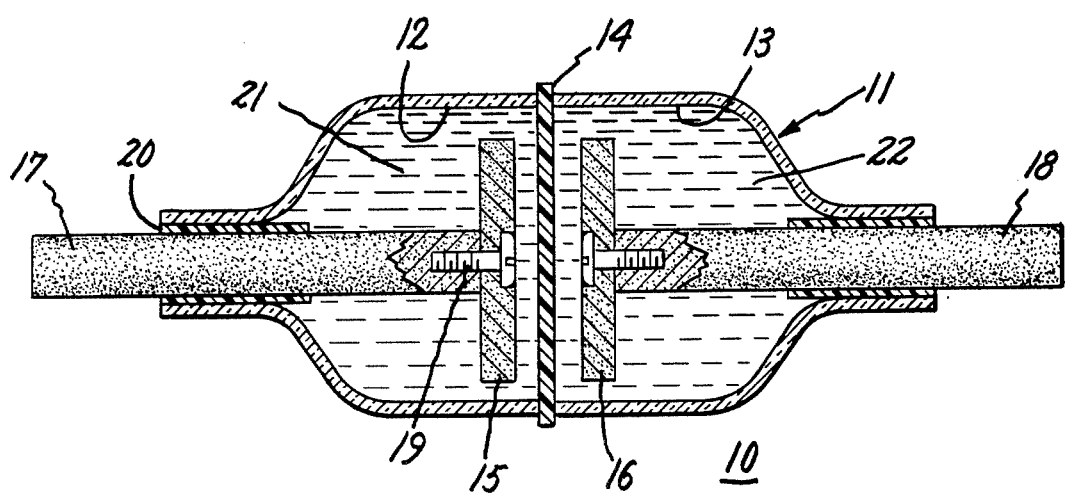

RECHARGEABLE AQUEOUS ZINC-HALOGEN CELL

This invention relates to electrochemical cells and more particularly, to rechargeable aqueous zinc-halogen cells employing at least one electrode substrate in the positive compartment consisting of vitreous carbon.

Zinc-halogen cells while disclosed in the patent literature prior to the turn of the century, have to this day, presented a number of well recognized disadvantages. A particular disadvantage of halogen electrodes is that the choice of electrode materials for halogen electrodes is limited to a few metals, a conductive oxide, ordinary carbon or graphite. The useable metals are tantalum and niobium and the conductive oxide is ruthenium oxide. All these materials, while stable, are too expensive to be economical. Ordinary carbon or graphite electrodes, when used for the anodic formation of halogens, exhibit short life due to structural changes, ultimately leading to complete loss of mechanical integrity.

In U.S. Pat. No. 3,573,105 entitled "Rechargeable Non-Aqueous Alkali Metal-Halogen Electrochemical Cells", there is described a rechargeable non-aqueous, as opposed to aqueous in the present invention, alkali metal-halogen electrochemical cell which includes an alkali metal anode, a halogen cathode of ordinary carbon, a non-aqueous electrolyte, and an ion-permeable barrier to inhibit migration of halogen to the negative electrode between the electrodes.

As opposed to ordinary carbon or graphite, the invention relates to the use of vitreous carbon. Vitreous or glassy carbon is a form of carbon discovered only relatively recently, that is, in 1963. It is prepared by carbonizing certain cross-linked polymers at temperatures below 1800° C. It has a density of only two-thirds of the theoretical density of graphite despite the fact that it has negligible porosity and gas permeability. Most strikingly and in vast contrast to ordinary carbons or graphite, vitreous carbon is isotropic with respect to electrical and thermal conductivity, thermal expansion and mechanical properties. It has also been shown to be more resistant to oxidation and it has been claimed to be highly resistant to attack by bromine and chlorine. The structure of vitreous carbon has not been fully established as yet. However, it appears that very small (50 Ångstroem) domains of trigonally bound carbon atoms are randomly linked by tetrahedrally-bound carbon atoms.

Vitreous or glassy carbon is discussed, for example, in "Vitreous Carbon — A New Form of Carbon" by F. C. Cowlard et al, on pages 507 – 512 of the "Journal of Materials Science 2" (1967) and in "Glass-Like Carbons" by Noda et al, on pages 285 – 302 of the "Journal of Non-Crystalline Solids I" (1969).

Vitreous carbon includes also foam forms which have an exceptional high void volume (up to 97%), and also exhibit high surface area with self-supporting rigidity. Such foam is described in U.S. Pat. No. 3,859,421 and in Chemotronics International Incorporated Bulletin No. 176 entitled "Reticulated Vitreous Carbon."

The present invention is directed to rechargeable aqueous zinc-halogen cells or batteries including a pair of porous electrode substrates, an ion exchange membrane therebetween, and at least the electrode substrate in the positive compartment consisting of vitreous carbon, an aqueous electrolytic solution containing a zinc salt selected from the class consisting of zinc bromide, zinc iodide, and mixtures thereof in both compartments, and halogen in the positive compartment.

It is an object of our invention to provide rechargeable aqueous zinc-halogen cells or batteries in which the electrode substrates exhibit virtually no signs of degradation.

In accordance with one aspect of our invention, a rechargeable aqueous zinc-halogen cell employs a casing, an ion exchange membrane in the casing defining a positive and a negative electrode compartment, an electrode substrate in each compartment, at least the electrode substrate in the positive compartment consisting of vitreous carbon, an aqueous electrolytic solution containing a zinc salt selected from the class consisting of zinc bromide, zinc iodide, and mixtures thereof in both compartments, and halogen in the positive compartment.

These and various other objects, features, and advantages of the invention will be better understood from the following description taken in connection with the accompanying drawing in which:

The single FIGURE is a sectional view of a rechargeable aqueous zinc-halogen cell made in accordance with our invention.

In the single FIGURE of the drawing, there is shown generally at 10 a rechargeable aqueous zinc-halogen cell embodying our invention. Cell 10 has a casing 11 which includes a positive compartment 12 and a negative compartment 13 separated by and defined by an ion exchange membrane 14. While casing 11 is shown as glass, various plastic materials can be employed such as, a polyolefin plastic or polytetrafloroethylene. The casing can also be made of metals which include an inner liner of a polytetrafluoroethylene.

A pair of vitreous carbon electrode substrates 15 and 16 are suspended within compartments 12 and 13, respectively, of casing 11 by rods of ordinary carbon 17 and 18, respectively. A screw 19 of ordinary carbon is shown for attaching each electrode substrate to its respective rod. A plastic sleeve 20 of polytetrafluoroethylene is fitted on a portion of each rod to provide an effective seal between each rod and the respective compartment. A fixture (not shown) is employed to position the compartments tightly together against the ion exchange membrane. Electrical leads (not shown) are connected to rods 17 and 18 and to a power source (not shown) or to an electrical load (not shown). Positive compartment 12 is the compartment which contains bromine at all times or at least during and after charging of the cell while the negative compartment 13 is the compartment in which zinc is deposited upon its electrode substrate 16. The positive compartment may or may not contain some bromine before charging. In negative compartment 13, electrode substrate 16 can also be made of porous metal of copper, silver, tin or lead in various forms, such as screens or foams.

An aqueous acidic electrolytic solution 21 containing a zinc salt such as zinc bromide is shown as 21 in positive compartment 12 and as 22 in negative compartment 13. While zinc bromide is described above for the electrolytic solution, the zinc-containing ion for the electrolyte can be selected from a zinc salt of zinc bromide, zinc iodide or mixtures thereof. The electrolytic solution will of course contain water but it may also contain one or more other salts such as potassium bromide, sodium bromide, sodium chloride, calcium bromide or calcium chloride. Halogen is preferably added to the electrolytic solution in the positive compartment in an amount from 1 to 10 weight percent before charging of the cell commences.

We have found that vitreous carbon is an ideal material for bromide, iodide and mixed electrolytes of bromide and iodide. In our long-term tests of repeatedly charging and discharging zinc-bromine cells, i.e., alternately forming and reducing bromide in the positive compartment, vitreous carbon electrodes show virtually no signs of degradation whereas ordinary carbon used as support rods and screws in the very same tests, completely lost their mechanical integrity. Vitreous carbon is the only electrode material known to us which has long life and yet is economically feasible for use as bromine, iodine, or mixed bromine and iodine electrodes. Vitreous carbon is not useable as a chlorine electrode where the zinc salt is zinc chloride.

As it was described previously, vitreous carbon is claimed to be highly resistant to chemical attack by bromine and chlorine. Such resistance to attack was demonstrated by subjecting vitreous carbon to elemental bromine and chlorine, respectively. In those tests no electrolytic solutions were employed and no electrical potential was applied that would have resulted in the electrochemical formation of bromine or chlorine. Such electrochemical formation, however, involves the formation of bromine or chlorine atoms and other reactants as intermediates which are known to be considerably more detrimental to carbon and graphite than elemental, molecular bromine or chlorine.

Our tests involve the electrochemical formation of bromine or chlorine.

We assembled a cell as shown in the single FIGURE of the drawing. Vitreous carbon foam was employed as the electrode substrate only in the positive compartment. The other electrode was a copper electrode substrate. The electrolyte comprised $2\overline{M}$ $ZnCl_2$ and $2\overline{M}$ NaCl. Additionally, the electrolyte in the positive compartment was saturated with chlorine by flowing chlorine gas through the compartment. Saturation corresponds to a chlorine concentration of a few percent by weight, depending on electrolyte concentration. The cell was charged with 75 ma/cm² for approximately 4 hours. This charging cycle resulted in complete disintegration of the vitreous carbon foam. Vitreous carbon is not resistant to attack by chlorine when a potential is applied. Thus, vitreous carbon is not useable as a chlorine electrode in a zinc-halogen cell. Surprisingly, the ordinary carbon rods had not shown yet any visible erosion.

We found unexpectedly, as is described below in Examples I and II, that vitreous carbon is an ideal material for bromine electrodes in a cell such as shown in the single FIGURE of the drawing. As will be seen from the Examples, the ordinary carbon rods were severely attacked by the bromine. Thus, vitreous carbon appears useful for bromine, iodine, and mixed bromine and iodine electrodes in zinc-halogen cells while vitreous carbon is not useable as a chlorine electrode.

Examples of rechargeable aqueous zinc-halogen cells made in accordance with our invention are set forth below:

EXAMPLE I

A rechargeable zinc-bromine cell was made in accordance with the above description and as shown in the single FIGURE of the drawing which consisted of two identical glass half cells, separated by a cation exchange membrane of sulfonated tetrafluoroethylene. Each half cell contained a vitreous carbon foam electrode substrate suspended by and fastened to a rod made of ordinary carbon. Both half cells were filled with an aqueous solution containing 55% $H_2O$, 15% $ZnBr_2$, 15% KBr and 15% $CaCl_2$ by weight. To one half cell 10% $Br_2$ was then added. The complete cell was then alternately charged and discharged with a current density of 25 ma/cm². Nearly 2000 such cycles of 2½ hours duration each were applied with no signs of degradation of the vitreous carbon foam, whereas the rod of ordinary carbon was attacked severely enough to require periodic replacement.

EXAMPLE II

A cell identically constructed like that in Example I was filled with an aqueous solution containing 40% $H_2O$, 30% $ZnBr_2$, 15% KBr and 15% $CaCl_2$ by weight. One cell half contained, in addition, 5% $Br_2$. The cell was cycled 100 times with 25 ma/cm² and then 18 times with 50 ma/cm². Each cycle lasted 5 hours. After completing these cycles, the vitreous carbon foam electrode substrate was completely unchanged, whereas the rod of ordinary carbon was badly eroded and had lost mechanical integrity.

While other modifications of the invention and variations thereof which may be employed within the scope of the invention have not been described, the invention is intended to include such as may be embraced within the following claims.

What we claim as new and desire to secure by Letters Patents of the United States is:

1. A rechargeable aqueous zinc-halogen cell comprising a casing, an ion exchange membrane in the casing defining a positive and negative electrode compartment, an electrode substrate in each compartment, at least the electrode substrate in the positive compartment consisting of vitreous carbon, and an aqueous electrolytic solution containing a zinc salt selected from the class consisting of zinc bromide, zinc iodide and mixtures thereof in both compartments.

2. A rechargeable aqueous zinc-halogen cell as in claim 1, in which both electrode substrates are vitreous carbon.

3. A rechargeable aqueous zinc-halogen cell as in claim 1, in which vitreous carbon is in the form of foam.

4. A rechargeable aqueous zinc-halogen cell as in claim 1, in which both electrode substrates are vitreous carbon, the ion exchange membrane is sulfonated tetrafluoroethylene, and the zinc salt is zinc bromide.

* * * * *